(12) United States Patent
Arita et al.

(10) Patent No.: US 11,241,821 B2
(45) Date of Patent: Feb. 8, 2022

(54) METHOD OF MANUFACTURING LAMINAR OBJECT AND ACTIVE ENERGY RAY CURABLE INK

(71) Applicant: RICOH COMPANY, LTD., Tokyo (JP)

(72) Inventors: Manabu Arita, Kanagawa (JP); Mie Yoshino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 768 days.

(21) Appl. No.: 15/981,238

(22) Filed: May 16, 2018

(65) Prior Publication Data

US 2018/0333909 A1 Nov. 22, 2018

(30) Foreign Application Priority Data

May 16, 2017 (JP) .............................. JP2017-097710
Apr. 3, 2018 (JP) .............................. JP2018-071483

(51) Int. Cl.
*B29C 64/112* (2017.01)
*B29C 64/264* (2017.01)
(Continued)

(52) U.S. Cl.
CPC .......... *B29C 64/112* (2017.08); *B29C 64/264* (2017.08); *C09D 11/101* (2013.01);
(Continued)

(58) Field of Classification Search
CPC ... B29C 64/112; B29C 64/264; C09D 11/101; C09D 11/38; B33Y 10/00; B33Y 70/00
(Continued)

(56) References Cited

U.S. PATENT DOCUMENTS

2015/0077481 A1 3/2015 Yoshino et al.
2015/0130878 A1 5/2015 Kohzuki et al.
(Continued)

FOREIGN PATENT DOCUMENTS

JP 2010-083140 A 4/2010
JP 2017-119402 A 7/2017
WO WO 2016/098678 A1 6/2016

OTHER PUBLICATIONS

Extended European Search Report dated Oct. 9, 2018 in European Patent Application No. 18172152.3, 6 pages.
(Continued)

*Primary Examiner* — Jeffrey M Wollschlager
*Assistant Examiner* — Xue H Liu
(74) *Attorney, Agent, or Firm* — Grüneberg and Myers PLLC

(57) ABSTRACT

A method of manufacturing a laminar object includes discharging an active energy ray curable ink A, irradiating the active energy ray curable ink A with active energy rays, discharging an active energy ray curable ink B, and irradiating the active energy ray curable ink B with the active energy rays, wherein the amount of the active energy rays per pass is greater in the irradiating of the active energy ray curable ink A than that in the irradiating of the active energy ray curable ink B, wherein a surface roughness Sq1 of solid printed matter having a thickness of 40 μm obtained in the discharging and the irradiating of the active energy ray curable ink A is 1.5 times or more than a surface roughness Sq2 of solid printed matter having a thickness of 40 μm obtained in the discharging and irradiating of the active energy ray curable ink B.

8 Claims, 3 Drawing Sheets

(51) Int. Cl.
  *C09D 11/101* (2014.01)
  *C09D 11/38* (2014.01)
  *B33Y 70/00* (2020.01)
  *B33Y 10/00* (2015.01)

(52) U.S. Cl.
  CPC .............. *C09D 11/38* (2013.01); *B33Y 10/00* (2014.12); *B33Y 70/00* (2014.12)

(58) Field of Classification Search
  USPC ........................................................ 264/401
  See application file for complete search history.

(56) References Cited

U.S. PATENT DOCUMENTS

| | | |
|---|---|---|
| 2015/0232675 A1 | 8/2015 | Yoshino et al. |
| 2016/0009931 A1 | 1/2016 | Kohzuki et al. |
| 2016/0075894 A1 | 3/2016 | Noguchi et al. |
| 2016/0326387 A1 | 11/2016 | Arita et al. |
| 2016/0347961 A1 | 12/2016 | Kobayashi et al. |
| 2017/0015850 A1 | 1/2017 | Yoshino et al. |
| 2017/0058135 A1* | 3/2017 | Kohzuki .............. C09D 11/101 |
| 2017/0182715 A1 | 6/2017 | Haida |
| 2017/0342283 A1 | 11/2017 | Takaku et al. |
| 2018/0016455 A1 | 1/2018 | Kohzuki et al. |

OTHER PUBLICATIONS

Takehiko Sato, et al., "Development of the Wide-Format UV Inkjet System "Acuity LED 1600"" Fujifilm Research & Development(No. 57-2012), p. 33-37.

* cited by examiner

METHOD OF MANUFACTURING LAMINAR OBJECT AND ACTIVE ENERGY RAY CURABLE INK

CROSS-REFERENCE TO RELATED APPLICATIONS

This patent application is based on and claims priority pursuant to 35 U.S.C. § 119 to Japanese Patent Application Nos. 2017-097710 and 2018-071483, filed on May 16, 2017 and Apr. 3, 2018, respectively, in the Japan Patent Office, the entire disclosures of which are hereby incorporated by reference herein.

BACKGROUND

Technical Field

The present disclosure relates to a method of manufacturing a laminar object and an active energy ray curable ink.

Description of the Related Art

Ultraviolet (UV) curable inkjet ink is widely used for decorative printing onto various building material, daily commodity, automobile equipment, etc., signature printing and display printing for drop curtains and posters utilizing advantages such as substrate applicability, quick drying, and toughness.

Also, laminar objects such as images having a rough surface and a three-dimensional (3D) printer fabrication objects are formed utilizing inkjet methods. For example, roughness such as swelling of oil in oil paintings, brush strokes, and fabric of canvas are reproduced in copying of oil paintings. To reproduce a finer form, form reproducibility of output against input is required. For forming of a laminar object formed by an inkjet method, rough forms can be reproduced through lamination of ink droplets. However, it is necessary to reduce wet spreading of the ink droplets to laminate layers with high accuracy and efficiency.

To the contrary, for ink having less wet spreading property for lamination, the feel of granularity of an obtained image significantly stands out, thereby degrading reproducibility of surface roughness. That is, it is difficult to strike a balance between reproducibility of solid form and reproducibility of surface form.

To strike this balance, for example, a leveling method utilizing time control is adopted in general. In the leveling method, ink droplets are cured in a longer time for finishing after the ink droplets land on a substrate to obtain surface smoothness.

SUMMARY

According to the present invention, provided is an improved method of manufacturing a laminar object which includes discharging an active energy ray curable ink A, irradiating the active energy ray curable ink A with active energy rays, discharging an active energy ray curable ink B, and irradiating the active energy ray curable ink B with the active energy rays, wherein the amount of the active energy rays per pass is greater in the irradiating of the active energy ray curable ink A than that in the irradiating of the active energy ray curable ink B, wherein a surface roughness Sq1 of solid printed matter having a thickness of 40 μm obtained in the discharging and the irradiating of the active energy ray curable ink A is one and a half again or more than a surface roughness Sq2 of solid printed matter having a thickness of 40 μm obtained in the discharging and irradiating of the active energy ray curable ink B.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
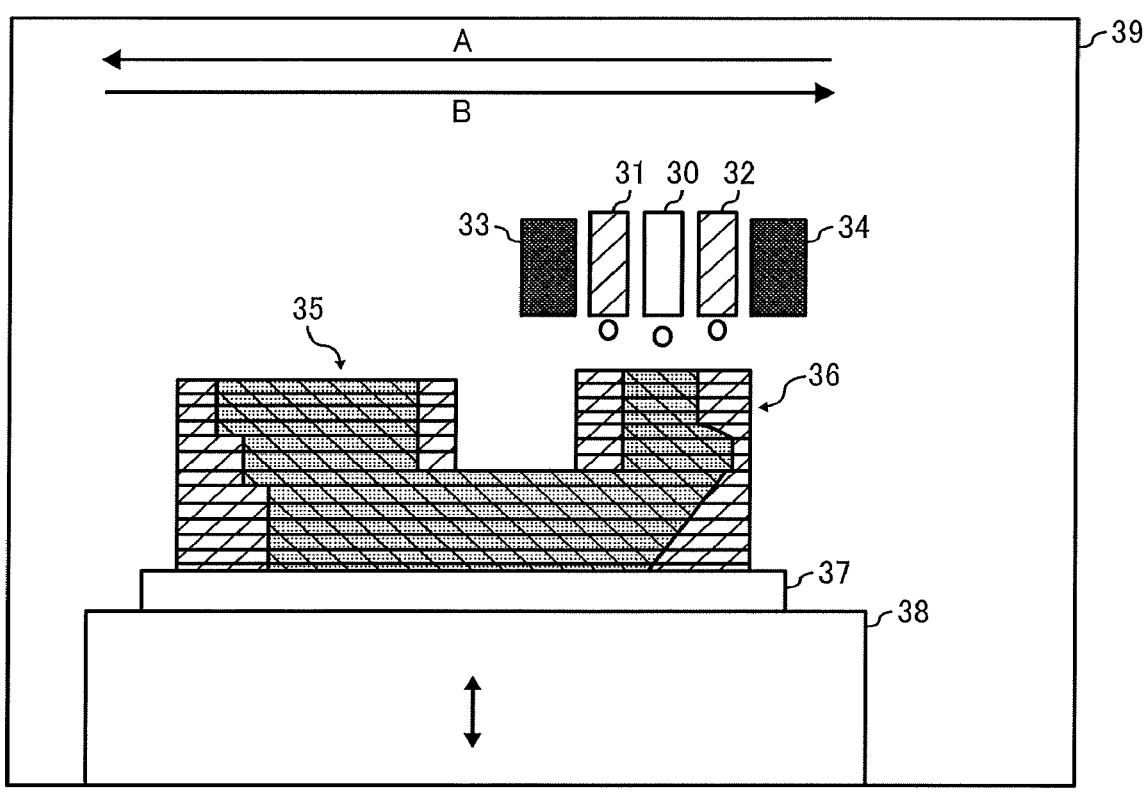
FIG. 1 is a schematic diagram illustrating an example of an image forming device according to an embodiment of the present disclosure.
Figure 2A:
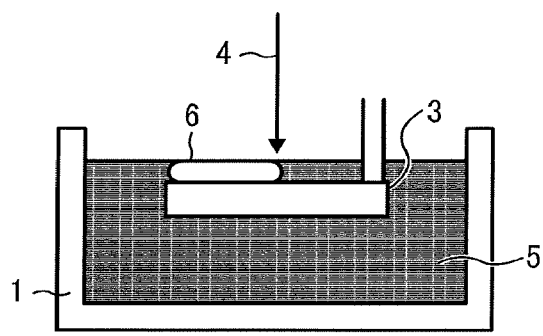
FIGS. 2A to 2D are schematic diagram illustrating another example of the image forming device according to an embodiment of the present disclosure.
Figure 2B:
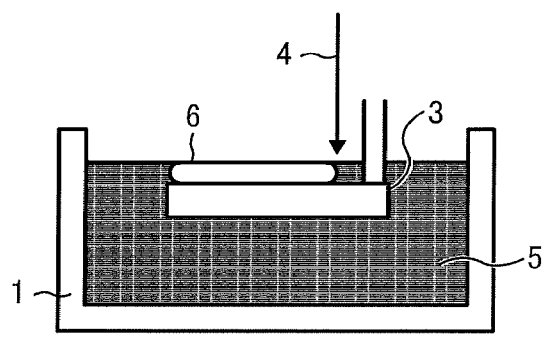
Figure 2C:
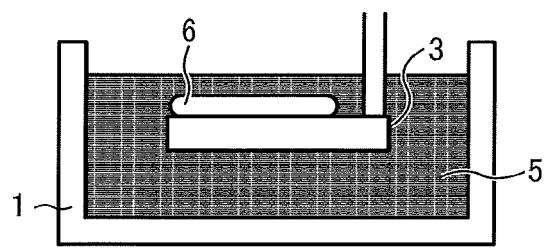
Figure 2D:
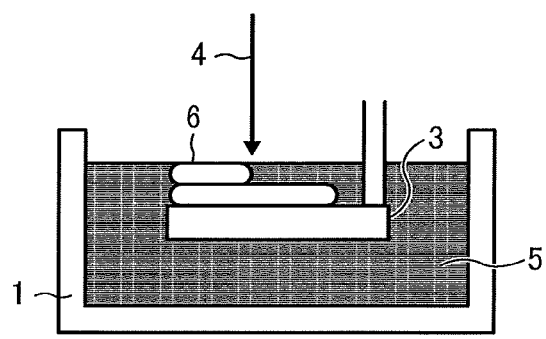

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Method of Manufacturing Laminar Object Utilizing Inkjet Method

The method of manufacturing a laminar object utilizing an inkjet method according to the present disclosure uses an active energy ray curable ink. It includes a first step of discharging an active energy ray curable ink A and irradiating the active energy ray curable ink A with active energy rays and a second step of discharging active energy ray curable ink and irradiating the active energy ray curable ink B with the active energy rays, wherein the amount of the active energy rays per pass is more in the irradiation of the active energy ray curable ink A than that in the irradiation of the active energy ray curable ink B, wherein the surface roughness Sq1 of solid printed matter having a thickness of 40 μm obtained in the first step is one and a half again or more than a surface roughness Sq2 of solid printed matter having a thickness of 40 μm obtained in the second step. This method also includes other optional steps.

Figure 3A:
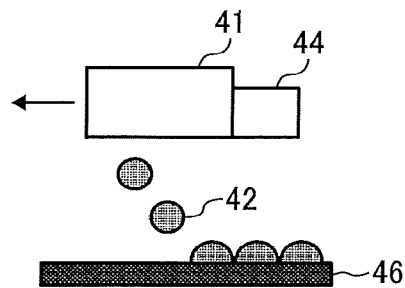
FIG. 3A is a schematic diagram illustrating an example of a typical method of forming a laminar object.
Figure 3B:
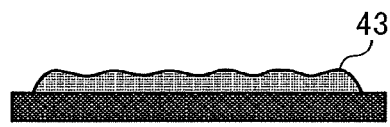
FIG. 3B is a schematic diagram illustrating another example of a typical method of forming a laminar object.
Figure 3C:
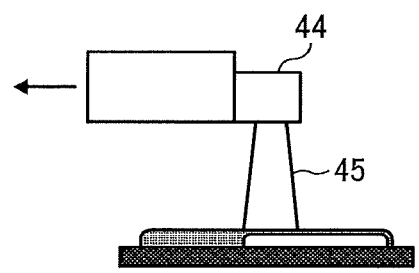
FIG. 3C is a schematic diagram illustrating a yet another example of a typical method of forming a laminar object.

The method of manufacturing a laminar object utilizing an inkjet method according to the present disclosure is made based on the knowledge that, although, in typical leveling methods, as illustrated in FIGS. 3A to 3C, an inkjet head 41 discharges a liquid droplet 42 to a substrate 46 to form a liquid film 43, and thereafter a light source 44 irradiates the liquid film 42 with ultraviolet rays 45 to cure it to reproduce (surface smoothness) of a surface form, which is controlled based on time by prolonging time to be taken to cure ink droplets with ultraviolet rays after the ink droplets land on the substrate 46, which causes problems such that printing speed is limited, controlling liquid dripping for a solid form having a slant surface is difficult, and applicability to an image having a concave portion is not desirable.

The method of manufacturing a laminar object utilizing an inkjet method according to the present disclosure repeats discharging of an active energy ray curable ink (hereinafter also referred to as ink or ultraviolet ray curable ink) to a substrate or printed matter to land it thereon and curing of the active energy ray curable ink with irradiation of ultraviolet rays.

As the active energy ray, considering it uses curing inhibition by oxygen, radical-based rays can be used. For example, electron beams can be also used as well as ultraviolet rays.

However, irradiation of electron beams in atmosphere is normally avoided to prevent production of ozone or not to attenuate electron beams. On the other hand, irradiation of ultraviolet rays in atmosphere causes no problem.

Figure 4A:
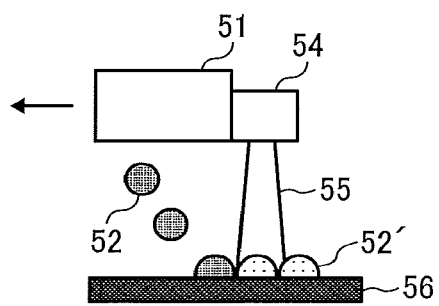
FIG. 4A is a schematic diagram illustrating an example of a method of manufacturing a laminar object utilizing an inkjet method according to an embodiment of the present disclosure.
Figure 4B:
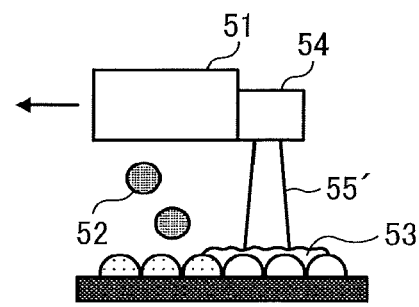
FIG. 4B is a schematic diagram illustrating another example of a method of manufacturing a laminar object utilizing an inkjet method according to an embodiment of the present disclosure.

As illustrated in FIGS. 4A and 4B, as the first step, an inkjet head 51 discharges a liquid droplet 52 to a substrate 56, and immediately thereafter a light source 54 emits active energy rays 55 having a great amount of light. An ink droplet 52' that has landed on the substrate 56 cures inside and outside (surface). Next, as the second step, to form the surface of the laminar object, the light source 54 irradiates the ink droplet 52 discharged from the inkjet head 51 with ultraviolet rays 55' having a small amount of light so that not the surface of the ink droplet 52 but the inside thereof cures. As a result, a surface 53 of the ink droplet 52 on the substrate 56 is wet. Therefore, the laminar object can be formed without taking a long time from the discharging of the liquid droplet to the curing and strikes a balance between reproducibility of the solid form and reproducibility of the surface form.

The curing state of the active energy ray curable ink changes depending on the amount of light of the active energy rays. With a great amount of light, the surface cures. With a small amount of light, solid-liquid separation state is obtained in which the surface is liquid with a solid inside. That is, in the first step utilizing a great amount of light, wettability of the active energy ray curable ink to printed matter is low because the surface of the printed matter is solid. In the second step utilizing a small amount of light, wettability of the active energy ray curable ink to printed matter is significantly high because liquid components are present on the surface of the printed matter. As wettability decreases, reproducibility of a solid form increases. As wettability increases, reproducibility (surface smoothness) of a surface form increases. In addition, as the difference between the wettability of the active energy ray curable ink in the first step and the wettability of the active energy ray curable ink in the second step increases, the balance between reproducibility of a solid form and reproducibility of a surface form by the identical active energy ray curable ink is improved.

Surface roughness is measured to evaluate reproducibility (surface smoothness) of a surface form. That is, "good surface smoothness" means "small surface roughness"

Reproducibility of a surface form includes gloss, etc. Therefore, small surface roughness does not necessarily mean good reproducibility of a surface form. Taking into account balance between reproducibility of a solid form and reproducibility of a surface form, large surface roughness creates a problem as a factor failing to strike the balance.

The method of manufacturing a laminar object of the present disclosure utilizing an inkjet method preferably includes discharging the active energy ray curable ink from an inkjet head in a state in which the active energy ray light source disposed in parallel with the inkjet head in a carriage is turned on.

Amount of Light of Active Energy Ray Emitted per Pass in First Active Energy Ray Irradiation and Second Active Energy Ray Irradiation The amount of light of active energy rays emitted per pass in the first active energy ray irradiation is greater than the amount of light of active energy ray emitted per pass in the second active energy ray irradiation. This makes it possible to strike a balance between reproducibility of a solid form and reproducibility of a surface form.

Surface Roughness of Printer Matter

The surface roughness Sq of printed matter represents wettability of an active energy ray curable ink. The value of Sq changes depending on step.

The surface roughness Sq1 of solid printed matter having a thickness of 40 μm obtained in the first step is one and a half again or more greater than the surface roughness Sq2 of solid printed matter having a thickness of 40 μm obtained in the second step. The surface roughness Sq can be measured using a 3D form measuring device (VR-3200, manufactured by KEYENCE CORPORATION) under the following conditions.

Condition

Measuring range: 8 mm square in center

Surface roughness: root-mean-square height Sq

Roughness regulation: ISO 25178-2: 2012

Filter type: Gaussian

Correction on end effect: Effective

S-filter: None

L-filter: 0.8 mm

First Step

The first step includes the first discharging, the first irradiation of active energy rays and other optional steps.

First Discharging

In the first discharging, active energy ray curable ink is discharged utilizing an inkjet method.

Active Energy Ray Curable Ink

The active energy ray curable ink preferably causes curing inhibition due to oxygen on a surface and also preferably a radically polymerizable composition easily incurring curing inhibition due to oxygen. In a semi-curing state, it is preferable to form a solid-liquid separation structure and more preferable to contain a two or higher functional monomer. For non-inclusion of such a bi- or higher functional monomer, for example, viscous matter is obtained instead of a solid-liquid separation state formed as a result of dissolution of a polymer obtained through polymerization in ink.

On the other hand, for inclusion of such a bi- or higher functional monomer, cured portions form a three-dimensional cross-linking structure, so that the cured portions are easily separated from non-cured portions.

In addition, the active energy ray curable ink preferably has a property of curing from inside. Although its mechanism is not clear, as the amount of multi-functional monomers increases, deep inside curability increases. If ultraviolet ray blocking does not occur ascribable to pigments, etc., typical color ink preferably has such an ink composition that the deep inside of the ultraviolet ray curable ink cures under a condition in which the typical color ink insufficiently cures inside due to shortage of the amount of ultraviolet rays. It also preferably has curability represented in the following relation 1 at the time of forming a bar coat film having a thickness of 40 µm.

(Amount of ray for surface curing/amount of ray for substrate interface curing)>1.5   Relation 1

Ink satisfying the relation 1 can be realized due to inhibition of surface curing caused by multi-functional monomers and oxygen. In addition, it is preferable to use a polymerization initiator (for example, Irgacure 819, manufactured by BASF) having a photobleach function, Moreover, the size of the ink droplet discharged is preferably large. Specifically, it is preferably 7 pL or greater and more preferably 10 pL or greater.

The amount of ray for surface curing means the amount of light below which, for example, when an active energy ray curable ink is applied to a polyethylene terephthalate (PET) substrate (E5100, 125 µm, manufactured by TOYOBO CO., LTD.) by a bar coat (wire bar #26) to form a coated film having a thickness of 40 µm, and an active energy ray irradiator (LH6, manufactured by Fusion Systems Japan) irradiates the coated film with active energy rays in atmosphere, the surface of the cured material having a cured film is scratched by a cotton swab. The amount of ray for substrate interface curing (inside curability) means the amount of light below which the reverse side is scratched by a cotton swab when a tape is attached to the surface of the cured matter and detached. The amount of light (mJ/cm$^2$) can be measured in the UVA range of UV Power Puck™ II (manufactured by Electronic Instrumentation & Technology, LLC)

In particular, this property is utilized to check curing properties of white ink or clear ink containing no pigment. In the actual lamination utilizing an inkjet method, the height of a droplet is about several µm. The impact of ultraviolet ray blocking ascribable to pigments is excluded and the curing property of the curable composition in ink is dominant so that this can be applied to any color.

The active energy ray curable ink contains monomers and preferably a polymerization initiator. Moreover, it may furthermore optionally contain a coloring agent, an organic solvent, and other components.

Monomer

The monomer is a compound which causes polymerization reaction by active species produced upon application of active energy rays (ultraviolet rays, electron beams, etc.) or active energy rays and cures. It includes multi-functional monomers, mono-functional monomers in accordance with the number of functional groups. The monomer can be any polymerizable composition, which may contain a polymerizable oligomer and a polymerizable polymer (macromonomer). These can be used alone or in combination.

Multi-Functional Monomer

Furthermore, the multi-functional monomer includes a bi-functional monomer, a tri-functional monomer, or a higher functional monomer.

The multi-functional monomer has no particular limit and can be suitably selected to suit to a particular application.

Specific examples include, but are not limited to, neopentyl glycol di(meth)acrylate, (poly)ethylene glycol di(meth)acrylate, diethylene glycol di(meth)acrylate, triethylene glycol di(meth)acrylate, tetraethylene glycol di(meth)acrylate, poly(propylene glycol di(meth)acrylate, dipropylene glycol di(meth)acrylate, tripropylene glycol di(meth)acrylate, (poly)tetramethylene glycol di(meth)acrylate, di(meth)acrylate of an adduct of bisphenly A with propyleneoxide (PO), ethoxyfied neopentyl glycol di(meth)acrylate, propoxynated neopentyl glycol di(meth)acrylate, di(meth)acrylate of an adduct of bisphenol A with ethylene oxide (EO), EO-modified pentaerythritol tri(meth)acrylate, PO-modified pentaerythritol tri(meth)acrylate, EO-modified pentaerythritol tetra(meth)acrylate, PO-modified pentaerythritol tetra (meth)acrylate, EO-modified dipentaerythritol tetra(meth) acrylate, PO-modified dipentaerythritol tetra(meth)acrylate, trimethylol propane tri(meth)acrylate, EO-modified trimethylol propane tri(meth)acrylate, PO-modified trimethylol propane tri(meth)actylate, EO-modified tetramethylol methane tetra(meth)acrylate, PO-modified tetramethylol methane tetra(meth)acrylate, pentaerythritol tetra(meth)acrylate, dipentaerythritol tetra(meth)acrylate, trimethylol propane tri (meth)acrylate, tetramethylol methane tetra(meth)acrylate, trimethylol ethanetri(meth)acrylate, bis(4-(meth)acryloxy polyethoxyphenyl)propane, diallylphthalate, triallyltrimellitate, 1,6-hexane diol di(meth)acrylate, 1,9-nonane diol (meth)acrylate, 1,3-butylene glycol di(meth)acrylate, 1,10-decane diol di(meth)acrylate, hydroxy pivalic acid neopentyl glycol di(meth)acrylate, tetramethylol methane tri(meth)acrylate, dimethylol tricyclodecane di(meth)acrylate, modified glycerine tri(meth)acrylate, an adduct of bisphenol A with diglycidylether (meth)acrylic acid, modified bisphenol A di(meth)acrylate, caprolactone-modified dipentaerythritol hexa(meth)acrylate, dipentaerythritol hexa(meth)acrylate, pentaerythritoltri(meth)acrylate tolylene diisocyanate urethane prepolymer, pentaerythritoltri(meth) acrylate hexamethylene diisocyanate urethane prepolymer, urethane(meth)acrylate oligomer, epoxy(meth)acrylate oligomer, polyester(meth)acrylate oligomer, polyether(meth) acrylate oligomer, and silicone (meth)acrylate oligomer. These can be used alone or in combination. Of these, two to six functional groups are preferable. Two-functional monomers are more preferable in terms of low viscosity.

The mass content of the multi-functional monomer is preferably 50 percent by mass or more in terms of curability and 90 percent by mass or less in terms of reduction of distortion of laminar object or substrate ascribable to curing shrinkage.

Mono-Functional Monomer

The mono-functional monomer has no particular limit and can be suitably selected to suit to a particular application.

Specific examples include, but are not limited to, hydroxyethyl(meth)acrylamide, (meth)acryloyl morpholine, dimethyl aminopropyl acrylamide, isobornyl(meth)acrylate, adamantyl(meth)acrylate, 2-methyl-2-adamantyl(meth) acrylate, dicyclopentanyl(meth)acrylate, dicyclopentenyl (meth)acrylate, dicyclopentenyloxy ethyl(meth)acrylate, 3,3,5-trimethylcyclohexane (meth)acrylate, t-butyl(meth) acrylate, tetrahydrofurfuryl(meth)acrylate, cyclohexyl (meth)acrylate, benzyl(meth)acrylate, 2-hydroxyethyl (meth)acrylate, 2-hydroxypropyl(meth)acrylate, 2-hydroxybutyl(meth)acrylate, isobutyl(meth)acrylate, phenoxyethyl(meth)acrylate, (2-methyl-2-ethyl-1,3-dioxolan-4-yl)methyl(meth)acrylate, and cyclic trimethylol propane formal acrylate. These can be used alone or in combination. Of these, (meth)acryloylmorpholine and benzyl(meth)acrylate are preferable.

In terms of viscosity, as the amount of the mono-functional monomer increases, viscosity thereof decreases. Therefore, it is preferable that the amount of the mono-functional monomer be large without having an adverse impact on curability in terms of the present disclosure.

Polymerization Initiator

The active energy ray curable composition of the present disclosure may contain a polymerization initiator. The polymerization initiator produces active species such as a radical or a cation upon application of energy of active energy rays and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable in the present disclosure. Due to curing inhibition of radical polymerization on the surface of a composition caused by oxygen, the curing state required for the present disclosure can be demonstrated. Moreover, the polymerization initiator preferably accounts for 5 to 20 percent by mass of the total content (100 percent by mass) of the composition to obtain sufficient curing speed.

Specific examples of the radical polymerization initiators include, but are not limited to, aromatic ketones, acylphosphineoxide compounds, aromatic oniumchlorides, organic peroxides, thio compounds (thioxanthone compounds, compounds including thiophenyl groups, etc.), hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator (sensitizer) can be optionally used together with the polymerization initiator. The polymerization accelerator is not particularly limited. Preferred examples thereof include, but are not limited to, amines such as trimethylamine, methyldimethanolamine, triethanolamine, p-diethylaminoacetophenone, p-dimethylaminoethylbenzoate, p-dimethylaminobenzoate-2-ethylhexyl, N,N-dimthylbenzylamine and 4,4'-bis(diethylamino) benzophenone. The content of the polymerization accelerator is suitably determined to a particular application depending on the identification of the polymerization initiator and the amount of polymerization initiator used in combination with the polymerization accelerator.

Coloring Agent

The active energy ray curable composition of the present disclosure may contain a coloring agent. As the coloring agent, although depending on the objectives and requisites of the composition in the present disclosure, various pigments and dyes can be used, which impart black, white, magenta, cyan, yellow, green, orange, and gloss color such as gold and silver. The proportion of the coloring agent is not particularly limited and determined considering the desired color density and dispersibility of the coloring agent in the curable composition, etc. It is preferable that the proportion of the coloring agent account for 0.1 to 30 percent by mass of the total content (100 percent by weight) of the composition. The active energy ray curable composition of the present disclosure preferably contains colorless or white ink specially for forming a base of a laminar object. Conversely, it preferably contains a coloring agent for use in image forming including surface decoration as the ink.

As the pigment, an inorganic or organic pigment can be used alone or in combination.

Specific examples of the inorganic pigment include, but are not limited to, carbon blacks (C.I. Pigment Black 7) such as furnace black, lamp black, acetylene black, and channel black, iron oxides, and titanium oxides.

Specific examples of the organic pigment include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelate such as basic dye type chelate and acid dye type chelate, dye lakes such as basic dye type lake and acidic dye type lake, nitro pigments, nitroso pigments, aniline black, and daylight fluorescent pigments.

In addition, a dispersant is optionally added to enhance dispersibility of a pigment. The dispersant has no particular limit. For example, it is suitable to use a polymer dispersant conventionally used to prepare a pigment dispersion.

The dye includes, for example, an acidic dye, a direct dye, a reactive dye, a basic dye, and a combination thereof.

Organic Solvent

The active energy ray curable composition of the present disclosure may contain an organic solvent, but if possible, it is preferred that the composition be free of an organic solvent. The composition free of an organic solvent, in particular a volatile organic compound (VOC), is preferable because it enhances safeness at where the composition is handled so that pollution of the environment can be prevented. The organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially included. The proportion is preferably less than 0.1 percent by mass.

Other Components

The active energy ray curable composition of the present disclosure may contain other known components. The other known components are not particularly limited. Examples are known articles such as surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

Preparation of Active Energy Ray Curable Composition

The active energy ray curable composition of the present disclosure can be prepared by using the components described above. The preparation devices and conditions are not particularly limited.

For example, the curable composition can be prepared by charging a polymerizable monomer, a pigment, a dispersant, etc., into a dispersing machine such as a ball mill, kitty mill, a disk mill, a pin mill, and a DYNO-MILL to prepare a pigment liquid dispersion followed by mixing with a polymerizable monomer, an initiator, a polymerization inhibitor, and a surfactant.

Viscosity

The viscosity of the active energy ray curable composition of the present disclosure has no particular limit and it can be adjusted to suit to a particular application and device.

For example, if a discharging device that discharges the composition from nozzles is used, the viscosity thereof is preferably in the range of from 3 to 40 mPa·s, more preferably from 5 to 15 mPa·s, and particularly preferably from 6 to 12 mPa·s in the temperature range of from 20 to 65 degrees C., preferably from 25 to 50 degrees C. In addition, it is particularly preferable to satisfy this viscosity range without containing the organic solvent mentioned above. Viscosity can be measured by a cone-and-plate type rotary viscometer (VISCOMETER TVE-22L, manufactured by TOKI SANGYO CO., LTD.) using a cone rotor (1° 34'×R24) at a number of rotation of 50 rpm with a setting of the temperature of hemathermal circulating water in a range of from 20 to 65 degrees C. VISCOMATE VM-150III can be used for the temperature control of the circulating water.

First Active Energy Ray Irradiation

The first active energy ray irradiation includes irradiation of active energy rays (ultraviolet rays).

The amount of light of the active energy ray per pass in the first active energy ray irradiation is preferably from 10 to 300 mJ/cm$^2$, more preferably from 15 to 250 mJ/cm$^2$, and particularly preferably from 15 to 200 mJ/cm$^2$.

It is preferable to control the power of active energy ray light source to adjust the amount of light of active energy rays in the first active energy ray irradiation.

Active Energy Ray

Active energy rays with which the active energy ray curable composition for use in the present disclosure cures are not particularly limited. For example, they are preferred when they can apply energy for polymerization reaction of polymerizable components in the curable composition. Specific examples include, but are not limited to, electron beams, α ray, β ray, γ ray, and X ray, in addition to ultraviolet rays. A particularly high energy light source obviates the need for a polymerization initiator to proceed polymerization reaction. In addition, in the case of irradiation of ultraviolet rays, mercury-free is strongly demanded in terms of protection of environment. Therefore, replacement with GaN-based ultraviolet light-emitting devices is greatly preferred from industrial and environmental point of view. Furthermore, ultraviolet ray light-emitting diode (UV-LED) and ultraviolet ray laser diode (UV-LD) are preferable.

Small size, long working life, high efficiency, and high cost performance thereof make such irradiation sources desirable as an ultraviolet light source.

However, irradiation of electron beams in atmosphere is avoided to prevent production of ozone or not to attenuate electron beams. On the other hand, irradiation of ultraviolet rays in atmosphere causes no problem.

Second Step

The second step includes the second discharging, the second irradiation of active energy rays, and other optional steps.

Second Discharging

In the second discharging, active energy ray curable ink is discharged utilizing an inkjet method.

The same active energy ray curable ink used in the first discharging can be used in the first discharging. The active energy ray curable ink in the second discharging is preferably identical to the active energy ray curable ink in the first discharging.

Second Active Energy Ray Irradiation

The second active energy ray irradiation includes irradiation of active energy rays (ultraviolet rays).

The second active energy ray irradiation has no particular limit as long as the amount of light of the active energy ray per pass in the first active energy ray irradiation is greater than that in the second active energy ray irradiation and can be suitably selected to suit to a particular application. For example, the second active energy ray irradiation can be the same as the first active energy ray irradiation.

Since the amount of light of the active energy ray per pass in the first active energy ray irradiation is greater than that in the second active energy ray irradiation, it is possible to strike a balance between reproducibility of a solid form and reproducibility of a surface form.

Application Field

The application field of the active energy ray curable composition for use in the present disclosure is not particularly limited. It can be applied to any field where the active energy ray curable composition is used. For example, the curable composition is selected suit to a particular application and used for a resin for processing, a paint, an adhesive, an insulant, a releasing agent, a coating material, a sealing material, various resists, and various optical materials.

Furthermore, the active energy ray curable composition for use in the present disclosure can be used as an ink to form two-dimensional texts, images, and designed coating film on various substrates and in addition as a solid object forming material to form a solid image having a rough surface and a three-dimensional solid image (solid fabrication object). The image forming method of the present disclosure is to strike a balance between the accuracy of a solid form and the surface smoothness of a solid fabrication object, in particular, for a solid image having a rough surface, gloss decoration having a swelling such as tile decoration, and a three-dimensional fabrication object.

This solid object forming material can be used as a binder for powder particles for use in powder additive manufacturing to form a solid object by repeating curing and lamination of powder layers. Also, it can be used as a solid object constituting material (model material) or supporting member (supporting material) for use in additive manufacturing (stereolithography) as illustrated in FIG. 1 and FIG. 2. FIG. 1 is a diagram illustrating a method of discharging the active energy ray curable composition for use in the present disclosure to a particular area followed by curing upon irradiation of active energy rays to form a layer and laminating the layers (detail of which is described later).

FIGS. 2A to 2D are diagrams illustrating a method of irradiating a pool (accommodating unit) 1 of the active energy ray curable composition 5 for use in the present disclosure with active energy rays 4 to form a cured layer 6 having a particular form on a movable stage 3 and sequentially laminating the cured layer 6 to form a solid freeform fabrication object.

An apparatus for fabricating a three-dimensional (solid) object by the active energy ray curable composition for use in the present disclosure is not particularly limited and can be a known apparatus.

For example, the apparatus includes a containing device, a supplying device, and a discharging device of the curable composition, and an active energy ray irradiator.

In addition, the present disclosure includes cured matter obtained by causing an active energy ray curable composition to cure and a molded processed product obtained by processing a structure of a substrate and the cured matter formed thereon.

The substrate is not particularly limited. It can be suitably selected to suit to a particular application. Examples are paper, fiber, threads, fabrics, leather, metal, plastic, glass, wood, ceramics, or composite materials thereof. Of these, plastic substrates are preferred in terms of processability.

Active Energy Ray Curable Ink

The active energy ray curable ink of the present disclosure contains a multi-functional monomer. The mass content of the multi-functional monomer is 50 percent by mass or more based on the total amount of the monomer. The active energy ray curable ink demonstrates curing property satisfying the following relation 1 at the time of manufacturing a bar coat film having a thickness of 40 μm and contains other optional components.

(Amount of ray for surface curing/amount of ray for substrate interface curing)>1.5    Relation 1

The active energy ray curable ink of the present disclosure can be the same as that for use in the method of manufacturing a laminar object utilizing an inkjet method of the present disclosure.

Laminar Object

The laminar object is formed by the method of manufacturing a laminar object utilizing an inkjet method of the present disclosure or the active energy ray curable ink of the present disclosure.

Composition Accommodating Container

A composition accommodating container contains the active energy ray curable composition and is suitable for the applications as described above. For example, if the active energy ray curable composition for use in the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matter such as dust in the ink can be prevented. In addition, the container can be of any size, any form, and any material. For example, the container can be designed to suit to a particular application. It is preferable to use a light blocking material to block the light or cover a container with a light blocking sheet, etc.

Image Forming Method and Image Forming Device

The image forming method of the present disclosure includes at least irradiating the active energy ray curable composition for use in the present disclosure with active energy rays to cause the curable composition to cure. The image forming device for use in the present disclosure includes at least an irradiator to irradiate the active energy ray curable composition with an active energy ray and a storing part containing the active energy ray curable composition for use in the present disclosure. The storing part may include the container mentioned above. Furthermore, the method and the apparatus may respectively include a discharging the active energy ray curable composition and a discharging device to discharge the active energy ray curable composition. The method of discharging the curable composition is not particularly limited. Examples are a continuous spraying method and an on-demand method. The on-demand method includes a piezo method, a thermal method, an electrostatic method, etc.

An example of the image forming device including an inkjet discharging device is described below. Each print unit for each color including an ink cartridge and a discharging head for active energy ray curable ink of each color of yellow, magenta, cyan, black, white, and clear discharges the ink to a recording medium. Thereafter, the light source equipped in the print unit emits active energy rays to cause the ink on the recording medium to cure and form an image. Thereafter, this image forming is repeated to form a solid image.

In the present disclosure, the irradiation of the active energy ray by the light source is controlled. The print unit emits a large amount of light in the initial stage of the solid image forming for forming a form and a small amount of light in the latter stage of the solid image forming to obtain surface smoothness. Thereafter, to promote curing of the surface, the image can be additionally irradiated after image forming. In addition, after the solid image forming, an image can be formed on the surface with another ink different from the ink for solid image forming.

Each of the print unit may include a heating mechanism to liquidize the ink at the ink discharging portion. Moreover, a mechanism may be optionally disposed which cools down the recording medium to an ambient temperature in a contact or non-contact manner. In addition, the inkjet recording method may be either of a serial method of discharging an ink onto a recording medium by moving the head while the recording medium intermittently moves in accordance with the width of a discharging head or a line method of discharging an ink onto a recording medium from a discharging head held at a fixed position while continuously moving the recording medium.

The recording medium is not particularly limited. Specific examples include, but are not limited to, paper, film, metal, or complex materials thereof. For example, the recording medium takes a sheet-like form. The image forming device may have a simplex printing configuration capable of printing on one side of a recording medium or a duplex printing configuration capable of printing on both sides thereof.

The recorded matter having images printed with the ink of the present disclosure includes articles having printed images or texts on a plain surface of conventional paper, resin film, etc., articles having printed images or texts on a rough surface, and articles having printed image or texts on a surface made of various materials such as metal or ceramic.

The present disclosure relates to a technology of reducing fine roughness of a base, and the roughness of a coated film originally present on a substrate can be measured by the same method. In addition, although it is not possible to sufficiently reduce a large concavo-convex portion (i.e., waving), the impact of this waving can be reduced by an L filter at measuring so that the same method is applicable.

FIG. 1 is a schematic diagram illustrating an example of the image forming device (device for fabricating a three-dimensional image) relating to the present disclosure. An image forming apparatus 39 illustrated in FIG. 1 stacks layers while discharging the first active energy ray curable composition from a discharging head unit 30 for fabrication and a second active energy ray curable composition composed of different ingredients from the first active energy ray curable composition from discharging head units 31 and 32 for a support by using a head unit having inkjet heads disposed movable in the directions indicated by the arrows A and B and causing each composition to cure by ultraviolet irradiators 33 and 34 disposed adjacent to the discharging head units 31 and 32. More specifically, for example, after the discharging head units 31 and 32 for a support discharge the second active energy ray curable composition onto a substrate 37 for fabrication, the second active energy ray curable composition is solidified upon application of irradiation of active energy rays to form a first support layer having a hollow space (pool) for fabrication, and the discharging head unit 30 for fabrication object discharges the first active energy ray curable composition onto the hollow space followed by irradiation of active energy rays for solidification, thereby to form a first fabrication layer. This step is repeated multiple times in accordance with the required number of lamination while moving the stage 38 up and down in the vertical direction to laminate the support layer and the fabrication layer to manufacture a solid free-form fabrication object 35. Thereafter, a laminated support 36 is removed, if desired. Although only a single discharging head unit 30 for fabrication object is disposed in FIG. 1, the device may have two or more discharging head units 30.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

In the following Examples, ultraviolet ray curable ink was used as an example of the active energy ray curable ink.

Manufacturing of Ultraviolet Ray Curable Inks 1 to 8

The compositions shown in the following Tables 1 and 2 were mixed and stirred to manufacture ultraviolet ray curable inks 1 to 8. The values in Tables 1 and 2 are represented in parts by mass.

Ink Curability

The thus-obtained ultraviolet ray curable ink was applied to a PET substrate (E5100, 125 pin, manufactured by TOYOBO CO., LTD.) with a bar coat (Wire bar #26) to form a film having a thickness of 40 μm followed by irradiation of active energy rays by an ultraviolet ray irradiator (LH6, manufactured by Fusion Systems Japan) in atmosphere to cause the film to cure, thereby obtaining a cured material. Surface curability (amount of light for surface curing) was evaluated by the amount of light below which the surface of the obtained cured material was scratched by a cotton web. In addition, substrate interface curability (inside curability) (amount of light for substrate interface) was evaluated in such a manner that a tape was attached to the surface of the cured material and detached to evaluate the curing state of the reverse side in the same manner as the surface curability. If the surface was not cured, the liquid component on the surface was wiped off with a cloth before evaluating the inside curability. The amount of light (mJ/cm$^2$) was measured in the UVA range of UV Power Puck™ II (manufactured by Electronic Instrumentation & Technology, LLC).

For the amount of light below the surface curing, the ultraviolet ray curable inks 1 to 3 were liquid while the ultraviolet ray curable inks 5 to 7 were viscous.

TABLE 1

| | | Ultraviolet ray curable ink No. | | | | |
|---|---|---|---|---|---|---|
| | | 1 | 2 | 3 | 4 | 5 |
| Mono-functional monomer | Acryloylmorpholine | 10.0 | 10.0 | 10.0 | 36.0 | 46.0 |
| | Benzyl acrylate | 9.0 | 9.0 | 9.0 | 30.0 | 39.0 |
| Multi-functional Monomer | Tripropyleneglycol diacrylate | 81.0 | 40.5 | — | — | — |
| | Nonane diol diacrylate | — | 40.5 | 81.0 | 30.0 | 10.0 |
| | Trimethylol propane triacrylate | — | — | — | — | — |
| Oligomer | Bi-functional urethane acrylate oligomer | — | — | — | 4.0 | 5.0 |
| Polymerization initiator | Bis(2,4,6-trimethyl benzoyl)-phenylphosphine oxide | 4.0 | 4.0 | 4.0 | 4.0 | 4.0 |
| | 2-(dimethylamino)-2-[(4-methylphenyl)methyl]-1-[4-(4-morphonyl)phenyl]-1-butanone | 4.0 | 4.0 | 4.0 | 4.0 | 4.0 |
| Coloring material | Titanium oxide pigment | 20.0 | 20.0 | 20.0 | 20.0 | 20.0 |
| Mass content of multi-functional Monomer to total amount of monomer (percent by mass) | | 81.0 | 81.0 | 81.0 | 30.0 | 10.0 |
| Ink curability | Amount of light for surface curing (40 μm coated film, mJ/cm$^2$) | 200 | 200 | 200 | 150 | 150 |
| | Amount of light for substrate interface curing (40 μm coated film, mJ/cm$^2$) | 50 | 50 | 100 | 500 | 500 |
| | (Amount of light for surface curing/amount of light for substrate interface curing) | 4.0 | 4.0 | 2.0 | 0.3 | 0.3 |

TABLE 2

| | | Ultraviolet ray curable ink No. | | |
|---|---|---|---|---|
| | | 6 | 7 | 8 |
| Mono-functional monomer | Acryloylmorpholine | 50.0 | 51.0 | — |
| | Benzyl acrylate | 42.0 | 43.0 | 39.0 |
| Multi-functional Monomer | Tripropyleneglycol diacrylate | — | — | — |
| | Nonane diol diacrylate | 2.0 | — | — |
| | Trimethylol propane triacrylate | — | — | 61.0 |
| Oligomer | Bi-functional urethane acrylate oligomer | 6.0 | 6.0 | — |
| Polymerization initiator | Bis(2,4,6-trimethylo benzoyl)-phenylphosphine oxide | 4.0 | 4.0 | 4.0 |
| | 2-(dimethylamino)-2-[(4-methylphenyl)methyl]-1-[4-(4-morphonyl)phenyl]-1-butanone | 4.0 | 4.0 | 4.0 |
| Coloring agent | Titanium oxide pigment | 20.0 | 20.0 | 20.0 |
| Mass content of multi-functional Monomer to total amount of monomer (percent by mass) | | 2.0 | — | 61.0 |
| Ink curability | Amount of light for surface curing (40 μm coated film, mJ/cm$^2$) | 100 | 100 | 200 |
| | Amount of light for substrate interface curing (40 μm coated film, mJ/cm$^2$) | 500 or greater | 500 or greater | 50 |
| | (Amount of light for surface curing/amount of light for substrate interface curing) | 0.2 or less | 0.2 or less | 4.0 |

In Tables 1 to 2, the product names and the manufacturing companies of the ingredients are as follows:

Mono-Functional Monomer

Acryloylmorpholine (ACMO): manufactured by KJ Chemicals Corporation

Benzylacrylate (BzA): VISCOAT® #160, manufactured by OSAKA ORGANIC CHEMICAL INDUSTRY LTD.

Multi-Functional Monomer

Tripropylene glycol diacrylate (TPGDA): APG-200, manufactured by Shin-Nakamura Chemical Co., Ltd Nonenediol diacrylate (NDDA: VISCOAT® #260, manufactured by OSAKA ORGANIC CHEMICAL INDUSTRY LTD.

Trimethylol propane triacrylate: VISCOAT® #295, manufactured by OSAKA ORGANIC CHEMICAL INDUSTRY LTD.

Oligomer

Bi-functional urethane acrylate oligomer (UA, mass average molecular mass, 8,000)*for controlling viscosity Polymerization Initiator Bis(2,4,6-trimethyl benzoyl)-phenylphosphine oxide: Irgacure 819, manufactured by BASF 2-(dimethylamino)-2-[(4-methylphenyl)methyl]-1-[4-(4-morphonyl)phenyl]-1-butanone: Irgacure 379, manufactured by BASF Coloring Agent Titanium oxide pigment: particle diameter 200 nm Evaluation on Ultraviolet Ray Curable Inks 1 to 8

Next, using the thus-obtained ultraviolet ray curable inks, solid form reproducibility and surface roughness Sq were evaluated. The results are shown in Table 3.

Forming of Laminar Object

An inkjet discharging device carrying MH5420 head (manufactured by Ricoh Company Ltd.) discharged droplets (10 pL per droplet) of each of the thus-obtained ultraviolet ray curable inks followed by irradiation of ultraviolet rays for printing in a single direction (outward only) at a resolution of 1,200 dpi×1,200 dpi with 8 passes, at a printing speed of 420 mm/second, and with an amount of ultraviolet rays per pass shown in Table 3.

The same ultraviolet ray light sources were disposed on the right side and left side to emit the same power of ultraviolet rays. For outward (scanning to the left with ink discharging), the ultraviolet ray (UV) light source on the right to the head was turned on, and for inward (scanning to the right with no ink discharging), both ultraviolet (UV) ray light sources were turned on. This reciprocation was defined as 1 pass. The distance between the head and the light source was 200 mm. Wet spreading deteriorates when the distance is too short. Too long a distance of, for example, 2 to 3 m degrades reproducibility.

The amount of light (mJ/cm$^2$) was measured in the UVA range of UV Power Puck™ II (manufactured by Electronic Instrumentation & Technology, LLC). This series of printing was repeated to form a laminar object.

As the substrate, polycarbonate substrate (Iupilon® NF-2000, average thickness of 0.5 mm, manufactured by MITSUBISHI GAS CHEMICAL COMPANY, INC.) was used. The ultraviolet (UV) ray light source used was metal halide (CoolArc, width of 85 mm, maximum power of 240 W/cm, manufactured by Baldwin). The same results were also obtained with a LED source.

Solid Form Reproducibility

A laminar object having a fine line-like form with a width of corresponding to 3 dots and a height of 550 μm and a laminar object having a line-like form with a width of 1 mm and a height of 550 μm were formed as input images in the same manner as in the forming of the laminar object described above. The fine lines were formed in parallel in the main scanning direction. The form of the thus-obtained laminar object was measured by a 3D form measuring device (VR-3200, manufactured by KEYENCE CORPORATION). The ratio (height of the laminar object having a fine line-like form having a width of 3 dots to height of the laminar object having a line-like form having a width of 1 mm) of the height of the laminar object having a fine line-like form having a width of 3 dots to the height of the laminar object having a line-like form having a width of 1 mm was defined as a solid form reproducibility.

It was confirmed that as the width of the line decreased at the degree of dot, the ratio (height of the laminar object having a fine line-like form having a width of 3 dots to height of the laminar object having a line-like form having a width of 1 mm) lowered, and also, the input height of 550 μm for the fine line having a width of 0.5 mm or greater irrespective of the identification of ink in this method of fabricating a laminar object was reproduced as was to obtain a constant height. Solid form reproducibility us preferably 0.5 or greater.

Surface Roughness Sq

A planar laminar object having a 10 mm square was formed according to each height shown in Table 3 in the same manner as in the forming of the laminar object described above. Using a 3D form measuring device (VR-3200, manufactured by KEYENCE CORPORATION), the surface roughness of the thus-obtained laminar object at each height was measured under the following condition. In addition, the surface roughness of a laminar object having a height of 40 μm under the print condition of the first step was defined as Sq1 and the surface roughness of a laminar object having a height of 40 μm under the print condition of the second step was defined as Sq2. The surface roughness Sq at a height of 550 μm is preferably 1.2 μm or less.

Condition
Measuring range: 8 mm square in center
Surface roughness: root-mean-square height Sq
Roughness regulation: ISO 25178-2: 2012
Filter type: Gaussian
Correction on end effect
S-filter: None
L-filter: 0.8 mm second step were continuously conducted. The layer thickness was not adjusted by the amount of liquid droplet but the number of layers. The amount of ultraviolet rays was not controlled by the print speed or the number of the light source turned on but changing the setting of power of the light source.

Next, using the laminar objects obtained in Examples 1 to 3 and Comparative Examples 1 and 2, solid form reproducibility and surface roughness Sq were evaluated in the same manner as in the evaluation of the ultraviolet ray curable inks 1 to 8. In addition, surface curability of laminar object was evaluated in the following manner. The results are shown in Table 4.

TABLE 3

| Ultraviolet ray curable ink No. | Amount of ultraviolet ray (mJ/cm², per pass) | Surface roughness Sq | | | | Solid form reproducibility Height of laminar object having a 3 dot fine line-like form/height of laminar object having a line-like form with width of 1 mm |
|---|---|---|---|---|---|---|
| | | Height 40 μm | Height 200 μm | Height 380 μm | Height 550 μm | |
| 1 | 18 | 0.45 | 0.55 | 0.64 | 0.68 | 0.23 |
|   | 64 | 0.49 | 0.71 | 0.73 | 0.73 | 0.37 |
|   | 113 | 1.15 | 1.78 | 2 | 2.18 | 0.57 |
|   | 174 | 1.29 | 2.02 | 2.1 | 2.24 | 0.58 |
| 2 | 64 | 0.54 | 0.7 | 0.73 | 0.86 | 0.32 |
|   | 113 | 1.11 | 1.72 | 1.83 | 2.09 | 0.55 |
| 3 | 18 | 0.44 | 0.9 | 2.22 | 3.32 | 0.19 |
|   | 64 | 0.46 | 0.75 | 1.96 | 2.8 | 0.29 |
|   | 113 | 0.8 | 1.49 | 1.55 | 1.72 | 0.49 |
|   | 174 | 1.08 | 1.65 | 1.71 | 1.95 | 0.53 |
| 4 | 18 | 1.12 | 1.76 | 1.84 | 2.08 | 0.57 |
|   | 64 | 1.18 | 1.9 | 2.2 | 2.28 | 0.69 |
|   | 113 | 1.24 | 2.23 | 2.43 | 2.57 | 0.73 |
| 5 | 64 | 1.19 | 2.2 | 2.75 | 2.89 | 0.76 |
| 6 | 64 | 1.18 | 2.24 | 2.85 | 3.08 | 0.77 |
| 7 | 64 | 1.23 | 2.25 | 2.94 | 3.21 | 0.77 |
| 8 | 64 | 0.58 | 0.77 | 0.81 | 1.03 | 0.33 |
|   | 113 | 1.15 | 1.83 | 1.96 | 2.04 | 0.53 |

Examples 1 to 3 and Comparative Examples 1 and 2

The laminar objects of Examples 1 to 3 and Comparative Example 1 and 2 were obtained in the same manner as in the forming of the laminar objects in the evaluation of the ultraviolet ray curable inks 1 to 8 except that the layer thickness and the amount of ultraviolet rays were set according to the conditions shown in Table 4. The first step and the Surface Curability of Laminar Object The surface of the thus-obtained laminar object was touched by finger to check stickiness and sliminess, and surface curability of laminar object was evaluated based on the following criteria.

Evaluation Criteria
A: No stickiness or sliminess
B: Sticky and slimy

TABLE 4

| | | Example | | | Comparative Example | |
|---|---|---|---|---|---|---|
| | | 1 | 2 | 3 | 1 | 2 |
| Ultraviolet ray curable ink | | 1 | 2 | 3 | 4 | 4 |
| First step (lamination step) | Thickness (μm) | 500 | 500 | 500 | 500 | 500 |
| | Amount of ultraviolet ray (mJ/cm², per pass) | 113 | 113 | 174 | 113 | 64 |
| Second step (surface process) | Thickness (μm) | 50 | 50 | 50 | 50 | 50 |
| | Amount of ultraviolet ray (mJ/cm², per pass) | 64 | 64 | 64 | 64 | 18 |
| Surface roughness Sq1 of solid printed matter having a thickness of 40 μm obtained in first step | | 1.15 | 1.11 | 1.08 | 1.24 | 1.18 |
| Surface roughness Sq2 of solid printed matter having a thickness of 40 μm obtained in second step | | 0.49 | 0.54 | 0.46 | 1.18 | 1.12 |

TABLE 4-continued

|  |  | Example | | | Comparative Example | |
| --- | --- | --- | --- | --- | --- | --- |
|  |  | 1 | 2 | 3 | 1 | 2 |
| Surface roughness Sq1 to surface roughness Sq2 of printed matter | | 2.35 | 2.06 | 2.35 | 1.05 | 1.05 |
| Evaluation Result | Solid form reproducibility (height of laminar object having 3 dot fine line-like form/height (550 μm) of laminar object having line-like form with width of 1 mm | 0.55 | 0.52 | 0.51 | 0.71 | 0.65 |
| | Surface roughness Sq (height 550 μm) | 0.92 | 1.04 | 1.13 | 2.34 | 2.12 |
| | Surface curability of laminar object | A | A | A | A | B |

Aspects of the present disclosure are, for example, as follows.

1. A method of manufacturing a laminar object with an inkjet method includes discharging an active energy ray curable ink A, irradiating the active energy ray curable ink A with active energy rays, discharging an active energy ray curable ink B, and irradiating the active energy ray curable ink B with the active energy rays, wherein the amount of the active energy rays per pass is more in the irradiation of the active energy ray curable ink A than that in the irradiation of the active energy ray curable ink B, wherein the surface roughness Sq1 of solid printed matter having a thickness of 40 μm obtained during the discharging and the irradiation of the active energy ray curable ink A and is one and a half again or more than the surface roughness Sq2 of solid printed matter having a thickness of 40 μm obtained during the discharging and irradiating of the active energy ray curable ink B.

2. The method according to 1 mentioned above, wherein the active energy ray curable ink A is identical to the active energy ray curable ink B.

3. The method according to 1 or 2 mentioned above further includes controlling the power of an active energy ray light source to adjust the amount of the active energy ray in the irradiating of the active energy ray curable ink A and the irradiation of the active energy ray curable ink B.

4. The method according to any one of 1 to 3 mentioned above, wherein an inkjet head discharges the active energy ray curable ink A and the active energy ray curable ink B in a state in which active energy ray light source disposed in parallel with the inkjet head in a carriage are turned on.

5. The method according to any one of 1 to 4 mentioned above, wherein the active energy ray curable ink A and the active energy ray curable ink B have a curability represented by the following relation 1 at the time of forming a bar coat film having a thickness of 40 μm.

(Amount of ray for surface curing/amount of ray for substrate interface curing)>1.5    Relation 1

6. The method according to any one of 1 to 5 mentioned above, wherein each of the active energy ray curable ink A and the active energy ray curable ink B contains a bi- or higher functional monomer in a mass content of 50 percent or greater based on the total mass of monomers in each of the active energy ray curable ink A and the active energy ray curable ink B.

7. The method according to 6 mentioned above, wherein the bi- or higher functional monomer accounts for 90 percent or less based on the total mass of the monomers.

8. The method according to 6 or 7 mentioned above, wherein the bi- or higher functional monomer is bi- to hexa-functional.

9. The method according to 8 mentioned above, wherein the bi- or higher functional monomer is bi-functional.

10. The method according to any one of 6 to 9 mentioned above, wherein the bi- or higher functional monomer is at least one of tripropylene glycol acrylate and nonane diol-diacrylate.

11. The method according to 6 or 10 mentioned above, wherein each of the active energy ray curable ink A and the active energy ray curable ink B further contains a mono-functional monomer.

12. The method according to 11 mentioned above, wherein the mono-functional monomer is at least one of acryloylmorpholine and benzylacrylate.

13. The method according to any one of 1 to 12 mentioned above, wherein the active energy rays are ultraviolet rays.

14. An active energy ray curable ink contains monomers containing a bi- or higher functional monomer in a mass content of 50 percent or greater based on a total mass of the monomers, wherein the ink has a curability represented by the following relation 1 at the time of forming a bar coat film having a thickness of 40 μm.

(Amount of ray for surface curing/amount of ray for substrate interface curing)>1.5    Relation 1

15. The ink according to 14 mentioned above, wherein the bi- or higher functional monomer accounts for 90 percent or less based on the total mass of the monomers in the ink.

16. The ink according to 14 or 15 mentioned above, wherein the bi- or higher functional monomer is at least one of tripropylene glycol acrylate and nonane dioldiacrylate.

17. The ink according to any one of 14 to 16 mentioned above, further contains an oligomer.

18. The ink according to any one of 14 to 17 mentioned above, further contains a mono-functional monomer.

19. The ink according to any one of 14 to 18 mentioned above, wherein the ink is an ultraviolet ray curable ink.

20. A laminar object formed by the method of manufacturing a laminar object of any one of 1 to 13 mentioned above or the active energy ray curable ink of any one of 14 to 19 mentioned above.

According to the present disclosure, a method of manufacturing a laminar object utilizing an inkjet method is provided which is capable of striking a balance between reproducibility of solid form and reproducibility of surface form.

Having now fully described embodiments of the present invention, it will be apparent to one of ordinary skill in the art that many changes and modifications can be made thereto without departing from the spirit and scope of embodiments of the invention as set forth herein.

What is claimed is:

1. A method of manufacturing a laminar object, comprising:
   discharging an active energy ray curable ink A;
   irradiating the active energy ray curable ink A with active energy rays;
   discharging an active energy ray curable ink B onto the active energy ray curable ink A that has been irradiated with the active energy rays; and
   irradiating the active energy ray curable ink B with the active energy rays,
   wherein an amount of the active energy rays per pass in the irradiating of the active energy ray curable ink A is greater than an amount of the active energy rays per pass in the irradiating of the active energy ray curable ink B,
   wherein a surface roughness Sq1 of solid printed matter having a thickness of 40 μm obtained in the discharging and the irradiating of the active energy ray curable ink A is 1.5 times or more of a surface roughness Sq2 of solid printed matter having a thickness of 40 μm obtained in the discharging and irradiating of the active energy ray curable ink B.

2. The method according to claim 1, wherein the active energy ray curable ink A is identical to the active energy ray curable ink B.

3. The method according to claim 1, further comprising controlling power of an active energy ray light source to adjust an amount of the active energy rays in the irradiating of the active energy ray curable ink A and the irradiating of the active energy ray curable ink B.

4. The method according to claim 1, wherein an inkjet head discharges the active energy ray curable ink A and the active energy ray curable ink B in a state in which an active energy ray light source disposed in parallel with the inkjet head in a carriage is turned on.

5. The method according to claim 1, wherein the active energy ray curable ink A and the active energy ray curable ink B have a curability represented by the following relation 1 at a time of forming a bar coat film having a thickness of 40 μm.

(Amount of rays for surface curing/amount of rays for substrate interface curing)>1.5     Relation 1.

6. The method according to claim 1, wherein each of the active energy ray curable ink A and the active energy ray curable ink B comprises a bi- or higher functional monomer in a mass content of 50 percent or greater based on a total mass of monomers in each of the active energy ray curable ink A and the active energy ray curable ink B.

7. The method according to claim 1, wherein the active energy rays are ultraviolet rays.

8. The method according to claim 1, wherein the method is an inkjet method.

* * * * *